O. G. WORSLEY.
SPRING WHEEL.
APPLICATION FILED OCT. 10, 1918.
1,297,287.
Patented Mar. 11, 1919.
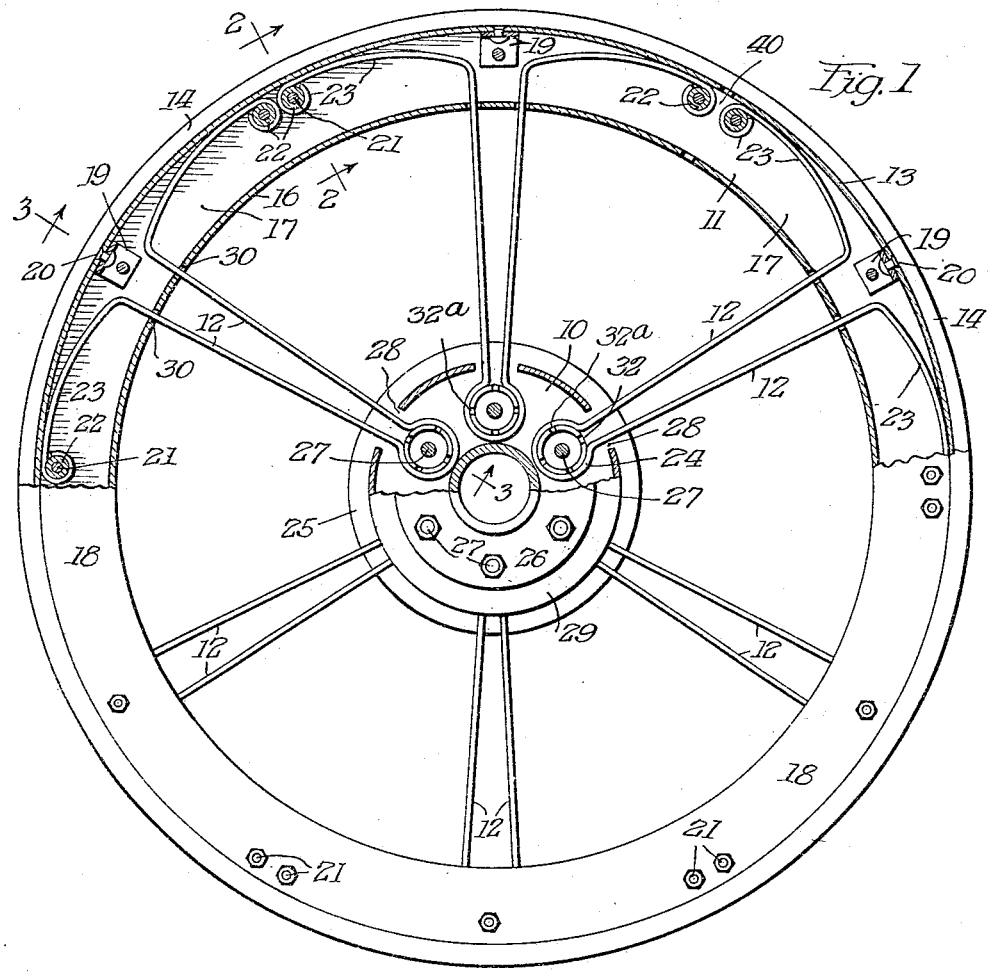
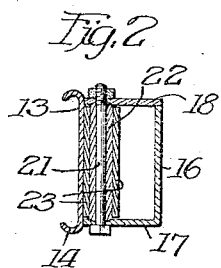
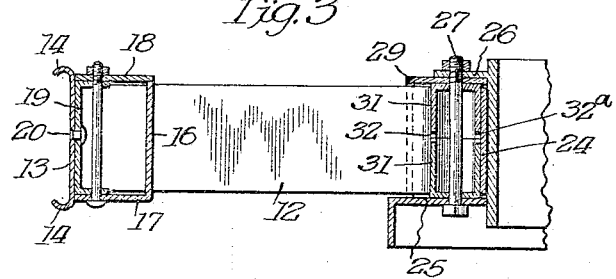
WITNESS:
L. W. Novander
INVENTOR.
Otto G. Worsley
By E. J. Andrews
ATTORNEY

UNITED STATES PATENT OFFICE.

OTTO G. WORSLEY, OF CHICAGO, ILLINOIS.

SPRING-WHEEL.

1,297,287.　　　　Specification of Letters Patent.　　Patented Mar. 11, 1919.

Application filed October 10, 1918. Serial No. 257,561.

*To all whom it may concern:*

Be it known that I, OTTO G. WORSLEY, a citizen of the United States, residing at Chicago, in the county of Cook and State of Illinois, have invented certain new and useful Improvements in Spring-Wheels, of which the following is a specification.

This invention relates to wheels to be used on vehicles of various classes, particularly to wheels the resiliency of which depends upon springs.

It is well understood that in case of automobiles traveling over rough roads, particularly at a high rate of speed, and also in case of trucks carrying heavy loads, the resilient portion of the wheel in practice has at least four functions: one, to provide a radial cushioning effect between the roadbed and the rigid or central portion of the wheel; another function is to provide shock absorbing means to overcome the effects of the rebound of the rigid portion of the wheel from the outer rim in case of sudden jars; another function is to provide for torsional stresses between the hub and the tire of the wheel, and another function is to provide for transverse or side stresses. One object of this invention is to provide a wheel which will carry out in a proper manner these various functions.

A further object of the invention is to provide simple, efficient and dependable resilient means for the wheel. Other objects of the invention will be apparent from a consideration of the accompanying drawings and the following description thereof.

Of the drawings Figure 1 is an elevation partly in section, of a wheel which embodies the features of my invention. Fig. 2 is a section along the line 2—2 of Fig. 1. And Fig. 3 is a section along the line 3—3 of Fig. 1.

The wheel comprises a hub 10, a hollow felly 11, and resilient members 12 which constitute the spokes. The felly may be built up in any suitable manner. I prefer to have it comprise an outer rim 13 with ordinary flanges 14 for attaching a pneumatic tire; and an inner rim 16, to which is fixed an annular side wall 17. The other side wall consists of a ring 18, the inner edge, when the wheel is assembled, pressing against the inner wall 16 of the felly, and the outer edge of the ring 18 and of the wall 17 being spaced apart by a bracket 19, which is fixed, (Fig. 3) to the outer rim 13, in any suitable manner, such as by means of rivets 20.

The resilient members 12 comprise a strap of steel having tubular shaped ends rotatably fixed within the felly by means of bolts 21 passing through the walls of the felly and through sleeves 22. The sleeves 22 have conical ends projecting into corresponding holes in the side walls of the felly so as to take the pressure off of the bolts 21. From these sleeves the portions of the same straps extend toward each other, and thus form resilient arms 23, which are fixed to the central or spoke portions of the straps, substantially at right angles thereto. The central portion of each strap is bent so as to form a tubular portion. Passing through each of these tubular portions are two abutting hollow journals 31, by means of which the strap is rotatably fixed between the side plates of the hub, or the side plate 25 of the brake drum, and the side plate 26 of the hub, by means of the bolt 27. The journals 31 have oil holes 32 into which oil may be passed into the interior of the journals, and other holes 32ᵃ through which the oil passes to the friction surfaces of the journals and straps. The doubled portion of the strap then extends outwardly from the hub through the slots 28, in the annular member 29 which forms the outer wall of the hub. The straps then extend to the felly, forming the spokes of the wheel, and pass into the felly through slots 30; and are bent substantially at right angles so as to form the aforementioned arms 23.

The ends of the arms 23 are pivoted to the sides walls of the fellies adjacent the outer wall; and the arms are curved, as shown, with a radius less than the radius of the outer wall, with the point of connection of the arms with the spoke portions of the straps being positioned normally near the central portion of the felly. This arrangement is such that as the weight of the vehicle presses down the arm will come against the outer wall of the felly, adjacent the pivot 21, and the arm will gradually bend, resisting the weight of the vehicle until the shoulder strikes against the outer wall of the felly.

By this arrangement the arms will produce a proper cushioning effect between the tire and the hub, which gradually stiffens as the weight overcomes the resistance of the arms. At the same time the spokes being constructed as described, are resilient, thus allowing slight but suitably limited and cushioned relative rotation of the tire and the hub. The slots 28, allow sufficient movement between the hub and spokes to provide for the unlike springing of the spokes because of the unlike stresses thereon due to their various positions relative to the direction of the force of the vehicle; but these slots limit suitably the relative rotations of the hub and felly. Similarly the slots 30, allow for the necessary springing of the straps.

A sufficient space 40 is provided between two of the bolts 21 to allow an air tube to pass from the pneumatic tire through the inner wall of the felly.

As to the aforementioned functions of the springs. The arms 23 provide the radial cushioning effect between the road-bed and the hub, and also provide shock absorbing means on the rebound, as these arms act resiliently in both directions; also the spokes provide means for cushioning the torsional stresses between the hub and the tire, and also the transverse stresses. And these statements are in general with reference to all of the springs at all times when any stresses occur. At the same time the springs are assembled so as to be normally somewhat strained, thus preventing rattling effects.

I claim as my invention:

1. In a spring wheel a hub, a hollow felly, and a plurality of members fixed to said hub and extending into said felly, each of said members comprising resilient arms extending in opposite direction in said felly and having tubular shaped ends, and means rotatably connecting said ends with said felly, said means comprising a sleeve passing through each of said tubular ends, said sleeve having conical ends, and the side walls of said felly having conical holes to receive said conical ends, and a bolt passing through said side walls' holes and through said sleeve.

2. In a spring wheel, a hub, a hollow felly, and a plurality of members extending from said hub into said felly, each of said members comprising a strap of steel, the two ends of said strap being rotatably connected to said felly, and the central portion of said strap being doubled, and passing from said felly to said hub, and being rotatably fixed to said hub, having a tubular shaped sleeve formed thereon, a hollow journal passing through said sleeve, and fixed to said hub.

In testimony whereof, I hereunto set my hand.

OTTO G. WORSLEY.

Copies of this patent may be obtained for five cents each, by addressing the "Commissioner of Patents, Washington, D. C."